United States Patent [19]
Vukovich et al.

[11] Patent Number: 4,493,228
[45] Date of Patent: Jan. 15, 1985

[54] THROTTLE CONTROL SYSTEM FOR AN AUTOMATIC SHIFT COUNTERSHAFT TRANSMISSION

[75] Inventors: William J. Vukovich; Michael R. Grimes, both of Ypsilanti, Mich.

[73] Assignee: General Motors Corporation, Detroit, Mich.

[21] Appl. No.: 329,395

[22] Filed: Dec. 10, 1981

Related U.S. Application Data

[63] Continuation of Ser. No. 135,665, Mar. 31, 1980, abandoned.

[51] Int. Cl.³ .............................................. B60K 41/18
[52] U.S. Cl. ........................................ 74/858; 74/860; 74/859; 74/866
[58] Field of Search ................... 74/866, 865, 860, 859, 74/858, 851; 364/424.1

[56] References Cited

U.S. PATENT DOCUMENTS

| 2,592,375 | 4/1952 | Ball | 74/858 |
|---|---|---|---|
| 2,622,711 | 12/1952 | Chambonneau | 192/0.08 |
| 3,272,028 | 9/1966 | Randol | 74/858 |
| 3,323,621 | 6/1967 | Péras | 74/858 |
| 3,327,553 | 6/1967 | Péras | 74/852 |
| 3,335,830 | 8/1967 | Castelet | 192/0.092 |
| 3,349,878 | 10/1967 | Castelet | 74/858 |
| 3,645,366 | 2/1972 | Numazawa et al. | 74/860 |
| 3,667,577 | 6/1972 | Weymann | 74/858 |
| 3,792,630 | 2/1974 | Hause | 74/860 |
| 3,808,738 | 5/1974 | Siebers et al. | 74/866 |
| 3,888,142 | 6/1975 | Ziegele | 74/852 |
| 3,898,894 | 8/1975 | Aono et al. | 74/856 |
| 3,939,738 | 2/1976 | Adey et al. | 74/859 |
| 4,009,699 | 3/1977 | Heltzer et al. | 123/117 D |
| 4,034,627 | 7/1977 | Mizote | 74/866 |
| 4,077,283 | 3/1978 | Hammond | 74/860 |
| 4,200,007 | 4/1980 | Espenschied et al. | 74/859 |
| 4,223,573 | 9/1980 | Franssen | 74/858 |
| 4,226,141 | 10/1980 | Espenschied | 74/858 |
| 4,266,447 | 5/1981 | Hees et al. | 74/852 |

FOREIGN PATENT DOCUMENTS

| 967268 | 5/1975 | Canada | 74/866 |
|---|---|---|---|
| 2022768 | 11/1970 | Fed. Rep. of Germany | 74/860 |
| 2106060 | 8/1971 | Fed. Rep. of Germany | 74/865 |
| 2217482 | 11/1973 | Fed. Rep. of Germany | 74/866 |
| 2622927 | 12/1976 | Fed. Rep. of Germany | 74/861 |
| 2018917 | 10/1979 | United Kingdom | |
| 1573097 | 8/1980 | United Kingdom | 74/859 |

Primary Examiner—Allan D. Herrmann
Assistant Examiner—D. Wright
Attorney, Agent, or Firm—Mark A. Navarre

[57] ABSTRACT

A vehicular control system for automatically shifting a countershaft transmission wherein the power control means is controlled in accordance with a manually operated accelerator pedal and shift requirements. During non-shift modes of operation, the power control means is adjusted in accordance with the manually operated accelerator pedal. During a shifting mode of operation, the power control means is adjusted in accordance with the shift requirements of the transmission. Once a desired gear ratio is engaged in the transmission, the power control setting is returned to correspond with the accelerator pedal setting at a rate dependent upon their difference. Means are also provided for modifying the return rate if the accelerator pedal setting is abruptly adjusted during the return.

12 Claims, 6 Drawing Figures

THROTTLE CONTROL SYSTEM FOR AN AUTOMATIC SHIFT COUNTERSHAFT TRANSMISSION

This application is a continuation of U.S. Ser. No. 135,665, filed Mar. 31, 1980 and now abandoned.

This invention relates to automatically shifting a vehicular countershaft transmission and more particularly to a linkageless control system for controlling the speed of an engine in accordance with an accelerator pedal setting and gear shift requirements.

As is well-known, a vehicular transmission is used to achieve a wide vehicle speed range despite a relatively narrow engine speed range. Transmissions generally provide a variety of distinct gear ratios through which the engine drives the vehicle so that the engine torque may be used most effectively over a wide range of operation. Consequently, the transmission must be shifted from one gear ratio to another as the speed of the vehicle is varied. With a countershaft transmission, the operator manually shifts the transmission by performing a sequence of steps. First, the engine is uncoupled from the transmission in order to facilitate the synchronizing of the gears to be engaged. The uncoupling is generally performed with a friction clutch that is disengaged upon actuation of a foot pedal in the passenger compartment of the vehicle. Since disengaging the clutch unloads the engine, the operator must adjust the accelerator pedal to prevent the engine from racing. The operator then moves a gear selector to engage the desired gear ratio. The movement of the gear selector first engages mechanical friction synchronizers which force the desired gears to rotate at the same speed to prevent the gears from clashing upon engagement. Once the desired gears are engaged, the clutch is manually reengaged and the accelerator is adjusted to a desired value. In order to shift the transmission smoothly, the execution of each of the above steps, especially the accelerator and clutch control, must be performed with precise timing.

It has been proposed to automatically shift a countershaft transmission using electrical control techniques to perform the shift sequence described above. An automatic shift is commenced by introducing an engine torque reversal (such as ignition interruption) so that the transmission may be shifted to the neutral position. Speed synchronization of the gears to be engaged may be performed by electrically comparing the input and output speeds of the transmission and by adjusting the speed of the transmission input shaft to reduce the speed difference of the gears to within an acceptably small margin. By maintaining clutch in an engaged position throughout the shift, engine throttle adjustments may be used to vary the transmission input shaft speed to bring the desired gears into speed synchronism. Once speed synchronism occurs, the gears are engaged and engine throttle control is returned to the operator of the vehicle. It will be appreciated that the term "throttle" as used herein refers generically to the means provided on a vehicular power source for controlling its speed and power output. On an excess air engine, for example, the power output is controlled by adjusting the injector rack length to vary the quantity of fuel supplied to the engine.

The object of any such control system is to obtain a smooth shift, especially in passenger car applications. Accurate throttle control is required in this regard as to both gear synchronization and the return of throttle control to the driver upon completion of the shift. Drivability is considerably enhanced if the throttle adjustments made by the control system do not affect the position of the accelerator pedal under the driver's foot. The prior art solutions to this problem involve the use of a mechanical linkage modifier or an auxiliary throttle valve to override the accelerator pedal setting during the shift. The above arrangements are often complicated or expensive to implement since they require significant modification to the standard automotive hardware. A more significant problem relates to the return of engine throttle control to the operator of the vehicle upon completion of the shift. Undesirably harsh torque fluctuations occur if the engine throttle setting is abruptly returned to the accelerator pedal setting which is manually controlled by the operator of the vehicle. This problem has been recognized and some prior art control systems include means for progressively returning the engine throttle upon completion of the shift. Such means, however, are provided in addition to a mechanical linkage between the accelerator pedal and the throttle, and as such, often permit the operator to adversely influence the quality of the shift through improper manipulation of the accelerator pedal during the shift sequence. More importantly, such prior art systems do not control the rate at which the engine throttle setting is returned to the accelerator pedal setting.

It is accordingly an object of this invention to provide an improved control system for automatically shifting a countershaft transmission wherein the power control means is controlled in accordance with a manually operated accelerator pedal setting when the transmission is not being shifted and in accordance with electrically developed shifting requirements during a transmission shift sequence.

It is a further object of this invention to provide an improved vehicular automatic gear shift control system that advantageously utilizes semiconductor digital computer controls to define a follow-up controller effective in non-shifting modes of operation to establish substantial correspondence between a manually operable accelerator pedal setting and a power control device, and also effective in a shifting mode of operation to execute a gear shift program and thereafter to adjust the setting of the power control device to a value corresponding to the accelerator setting and thereupon to reinstitute follow-up accelerator control.

It is a further object of this invention to provide an improved throttle control system wherein an electrically energizable throttle actuator is energized in accordance with one of a plurality of control programs depending upon the mode of operation of the vehicle.

It is a further object of this invention to provide a vehicular control system for adjusting a power control setting into correspondence with a manually operable accelerator setting upon engagement of a desired gear ratio wherein the rate at which the power control setting is adjusted is controlled as a function of the difference therebetween upon engagement.

It is a further object of this invention to provide a vehicular control system for adjusting a power control setting into correspondence with a manually operable accelerator pedal setting upon engagement of a desired gear ratio wherein the rate at which the power control setting is adjusted is controlled as a function of the difference therebetween at engagement and wherein the rate is modified if the accelerator pedal setting is adjusted in excess of a reference value.

These objects are carried forward by providing control means including a stepper motor for adjusting the power control means in accordance with an error signal generated by the control system. Normally the error signal is developed as a function of the difference between the setting of a manually operable accelerator pedal and the setting of the power control means. This mode of operation defines a follow-up control system wherein the power control setting is adjusted to follow the setting of the accelerator pedal. During a shifting mode of operation the error signal is developed as a function of the difference between the transmission input shaft speed and a desired speed calculated to synchronize the speed of transmission gear elements associated with a desired gear ratio. This mode of operation defines a closed-loop or follow-up control system wherein the setting of the power control means is adjusted in a manner to cause the input shaft speed to correspond to the speed of a transmission gear element associated with the desired gear ratio. Upon engagement of the desired gear ratio, the power control setting is returned to correspond with the accelerator pedal setting at a controlled rate, the rate being dependent upon the difference therebetween at the time of gear engagement. The control system is also capable of modifying this rate of change in response to an accelerator pedal movement in excess of a reference amount following gear engagement. When the settings of the accelerator pedal and the power control means substantially correspond the system returns to the first-mentioned follow-up mode of operation wherein the error signal is developed as a function of the difference therebetween. The above-described shift sequence results in an automatically controlled shift displaying superior drivability as compared to prior automatic shift control systems.

Figure 1:
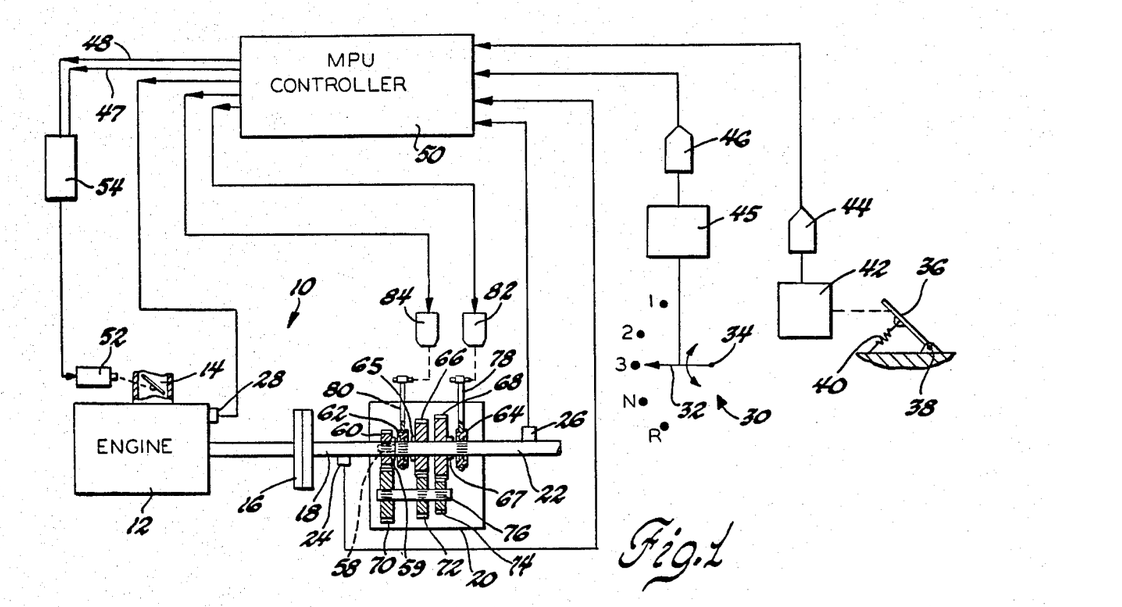
FIG. 1 is a schematic representation of a vehicular drive train and control system made in accordance with this invention.

Referring now to FIG. 1, reference numeral 10 generally designates a vehicular power plant and drive train comprising engine 12, throttle assembly 14, friction clutch 16, input shaft 18, multigear ratio countershaft transmission 20 and output shaft 22. Input speed transducer 24 is located between clutch 16 and transmission 20 and provides digital information relating to the rotational speed of input shaft 18. Speed transducer 26 similarly provides digital information relating to the rotational speed of output shaft 22. Speed transducers 24 and 26 may be of the magnetic pickup type as shown and described in the patent to Hetzler et al, U.S. Pat. No. 4,009,699 that provide electrical pulses at a rate proportional to the rotational speed of a toothed wheel fixed to a rotating shaft. Reference numeral 30 generally designates a manually operable gear selector for indicating a desired gear ratio to be engaged in transmission 20. Gear selector 30 is shown schematically as a manually operable switch wherein switch arm 32 may be rotated about pin 34 to select either first gear (1), second gear (2), third gear (3), neutral (N), or reverse (R) positions as shown. Gear selector 30 forms no part of this invention and may take the form of any of a number of known gear selection means, including an automatic shift pattern generator. Transducer 45 is connected to switch arm 32 of gear selector 30 for the purpose of providing an indication of the desired gear ratio, and may be implemented, for example, with a potentiometer or other suitable analog device. Reference numeral 36 designates a manually operable power demand device in the form of an accelerator pedal pivoted about pin 38 and restrained by return spring 40. Transducer 42 is connected to accelerator pedal 36 for the purpose of providing an indication of the accelerator pedal setting, and as will be well-known to those skilled in the art, may be implemented with a potentiometer, the tap position being controlled by the setting of accelerator pedal 36. Analog-to-digital converters (A/D) 44 and 46 operate in a well-known manner to convert the outputs of transducers 42 and 45 to a digital format. The output voltages of speed transducers 24 and 26 as well as the outputs of A/D converters 44 and 46 are applied as inputs to MPU controller 50. The output shaft of stepper motor 52 is mechanically connected to engine throttle 14 and controls the throttle setting in accordance with signals applied to stepper motor translator 54. As will be later described, MPU controller 50 develops a throttle control signal as a function of the various inputs and applies the throttle control signal to translator 54 via lines 47 and 48 in a standard format. Translator 54 operates in a well known manner to control the energization of stepper motor 52 in accordance with the standard format throttle control signals. A stepper motor and translator that satisfy the above-described specifications are the model number M092-FD08E stepper motor and the model number STM 1800D translator manufactured by Superior Electric Company, Bristol, Conn. Switch 28 is adapted to interrupt the ignition system of engine 12 in accordance with an output of MPU controller 50, as will later be described.

Transmission 20 may be any of a number of presently available multi-gear ratio countershaft transmissions, such as those manufactued by Chevrolet Motor Division of General Motors Corporation. Transmission 20 is illustrated schematically, however, since an unsynchronized transmission (unlike most automotive transmissions) may be used in conjunction with the control system of this invention as will be later explained. The gears shown, however, operate in a well known manner as follows. Output shaft 22 is piloted into input shaft 18 as indicated by reference numeral 58 to enable one shaft to rotate freely relative to the other. Third gear 60 is splined to input shaft 18 and dog clutches 62 and 64 are splined to output shaft 22. It will be appreciated that the splined connections prevent the members so connected from rotating relative to each other. Second gear 66 and first gear 68 on the other hand, are free to rotate about output shaft 22. Gears 70, 72 and 74 are splined to countershaft 76 which is supported by the transmission case (not shown). The reverse and reverse idler gears have been omitted for the purpose of simplification. Transmission 20 is shown in neutral position; no power can be transmitted to output shaft 22 because no gear is nonrotatably connected to output shaft 22. To engage first gear, dog clutch 64 is shifted by control arm 78 to engage the axially extending gear teeth 67 of first gear 68. Since dog clutch 64 is nonrotatably connected to output shaft 22, power may be transmitted from input shaft 18 through gears 60 and 70 to countershaft 76 and through gears 74 and 68 and dog clutch 64 to output shaft 22. In a similar manner, second gear may be engaged by disengaging dog clutch 64 from first gear 68 and manipulating control arm 80 to shift dog clutch 62 into engagement with the axially extending gear teeth 65 of second gear 66. In this case power may be transmitted from input shaft 18 through gears 60 and 70 to countershaft 76 and through gears 72 and 66 and dog clutch 62 to output shaft 22. In a similar manner, third gear may be engaged by manipulating control arm 80 to shift dog clutch 62 into engagement with the axially extending gear teeth 59 of third gear 60. For this gear ratio power may be transmitted from input shaft 18 through gear 60 and dog clutch 62 to output shaft 22. In each case, a dog clutch and a gear must be rotating at the same speed (synchronized) before they may be engaged. The control system of this invention achieves the desired synchronization by adjusting engine throttle 14 in a manner to cause the gear element (60, 66, 68) associated with the desired gear ratio to rotate at substantially the same speed as dog clutches 62 and 64, which are splined to output shaft 22. Accordingly, transmission 20 need not include the mechanical synchronizers generally used in present day automotive transmissions.

In a conventional manual transmission, control arms 78 and 80 are connected through a mechanical linkage to a manually operated gear shift. According to this invention, however, solenoids 82 and 84 are adapted to shift the position of control arms 78 and 80 respectively in accordance with control signals applied to the solenoids by MPU controller 50. It will be appreciated that solenoids 82 and 84 may be standard two-position or three-position solenoids depending upon the shift requirements of the particular transmission used. Although clutch 16 need not be disengaged in order to perform a shifting sequence, it is needed in order to uncouple engine 12 from transmission 20 when the vehicle is brought to a stop. Accordingly, clutch 16 may be a standard manually operated disc-type clutch, or a centrifugal type clutch that becomes disengaged when the speed of shaft 18 is reduced below a predetermined low level.

Although engine 12 has been described as a carburated internal combustion engine, it should be appreciated that this invention equally applies to any other type of engine having power control means for adjusting its speed and power output, including by way of example and without any limitation, a non-carburated internal combustion engine such as a fuel-injected diesel or gas turbine engine, an external combustion engine such as a Stirling engine, an electric engine such as an electric traction motor, or any other suitable power source.

Figure 2:
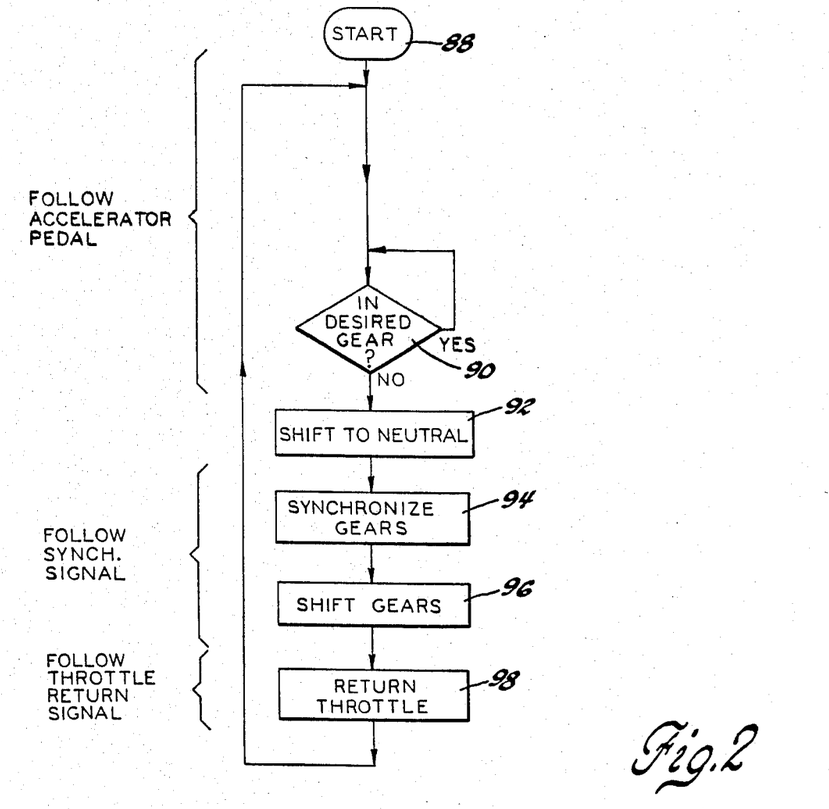
FIG. 2 is a flow diagram illustrating the shift sequence of this invention.

FIG. 2 is a simplified flow diagram illustrating a typical shift sequence performed by the control system of this invention. Reference numeral 88 designates a starting point for the sequence, as for example when the electrical system of the vehicle is initially energized. The first major step, designated by reference numeral 90, is to determine if the desired transmission gear ratio is engaged. The presently engaged gear ratio may be determined by limit switches and suitable logic circuitry (not shown) adapted to sense the position of dog clutch control arms 78 and 80. If the desired gear ratio as determined by gear selector 30 is engaged, a shifting operation is not required and the controller remains in a wait mode. If the desired gear ratio is not engaged, a shift sequence is initiated comprising the steps of shifting the transmission to a neutral position (block 92), synchronizing the gear elements associated with the desired gear ratio (block 94), engaging the desired gear ratio (block 96), and adjusting engine throttle 14 into correspondence with the accelerator pedal setting as determined by transducer 42 (block 98). The first step of shifting the transmission to neutral is accomplished by actuating the appropriate solenoid 82 or 84 while engine 12 is undergoing a torque reversal. The torque reversal, which is brought about by actuating switch 28 to temporarily interrupt or short the engine ignition system, temporarily eases the engagement force applied to the transmission gear elements so that a solenoid (82 or 84) may disengage the undesired gear ratio. As will be appreciated, switch 28 may be a solid state switch or similar device adapted to momentarily short the engine ignition supply circuit. Once the transmission is shifted to neutral, the next step of the shift sequence is to energize stepper motor 52 to adjust engine throttle 14 in a manner to synchronize the gear elements associated with the desired gear ratio. It will be appreciated that by adjusting the engine throttle or power control setting, the rotational speed of the various transmission gear elements may also be adjusted. The engine speed required for synchronization may be calculated in MPU controller 50 by multiplying the rotational speed of output shaft 22 (as determined by speed transducer 26) by the desired gear ratio, which is a known number. Once the engine speed required for synchronization is known, MPU controller 50 determines a corresponding throttle adjustment and applies a signal indicative of the adjustment to stepper motor translator 54. Synchronization of the gear elements associated with the desired gear ratio may then be detected by comparing the speed ratio of input shaft 18 to output shaft 22 with the desired gear ratio. When synchronization is substantially attained, solenoid 82 or 84 is energized to shift the appropriate dog clutch 64 or 62 to engage the desired gear ratio. Once the gears are engaged, the final step of the shift sequence (block 98) is to return the setting of engine throttle 14 into correspondence with the setting of accelerator pedal 36. The return step significantly affects the drivability of the shift and this invention recognizes the importance of the rate at which throttle 14 is returned. Accordingly, the setting of throttle 14 is adjusted into correspondence with the setting of accelerator pedal 36 at a rate dependent upon their difference at the time of gear engagement. In this way the shift feel following engagement of the desired gear ratio corresponds to the accelerator pedal setting chosen by the operator of the vehicle. If the operator has chosen a heavy accelerator pedal setting, throttle 14 is adjusted into correspondence with the heavy setting at a fast rate. If on the other hand the operator has chosen a light accelerator pedal setting, throttle 14 is adjusted into correspondence with the light setting at a slow rate. Should the operator of the vehicle adjust the accelerator pedal setting by more than a predetermined amount during the return throttle step, the rate at which the throttle is returned may be correspondingly adjusted. The throttle return rate adjustment corresponds to a second embodiment of this invention that achieves a more responsive throttle control. Generally, when the operator of a vehicle abruptly adjusts the accelerator pedal setting, he or she expects the vehicle to respond immediately. Accordingly, the MPU controller in the second embodiment monitors accelerator pedal movement during the throttle return step. Since the average throttle return time is relatively short (about 0.5 sec.), a fixed change in accelerator pedal position may be used to designate an accelerator pedal movement sufficiently abrupt to require modification of the throttle return rate. When the MPU controller detects a sufficiently abrupt accelerator pedal movement, it is assumed that the driver intends to suddenly alter the speed of the vehicle, and the throttle return rate is immediately modified in a manner to quickly bring the engine throttle setting into correspondence with the accelerator pedal setting. As when a single throttle return rate is used, the MPU controller reverts to conventional closed loop control when the engine throttle setting substantially corresponds with the accelerator pedal setting. At this point, the shift sequence is completed and MPU controller 50 again determines whether the desired gear ratio is engaged (block 90).

As indicated in FIG. 2, MPU controller 50 controls the setting of throttle 14 in accordance with three shift requirements. When no shift is necessary and upon completion of a shift sequence, the setting of throttle 14 is controlled in a closed-loop manner in accordance with the setting of accelerator pedal 36. When the transmission has been shifted to neutral as part of a shift sequence, MPU controller 50 controls the setting of throttle 14 in a manner to synchronize the gear elements associated with the desired gear ratio as a function of the desired gear ratio and the speed of output shaft 22. Finally, when a desired gear ratio has been engaged as part of a shift sequence, MPU controller 50 controls setting of throttle 14 in a manner to adjust throttle 14 into correspondence with the setting of accelerator pedal 36 at a rate dependent upon the difference between the two settings. Once throttle 14 is returned, it is controlled once again in a closed-loop manner according to the setting of accelerator pedal 36.

Figure 3:
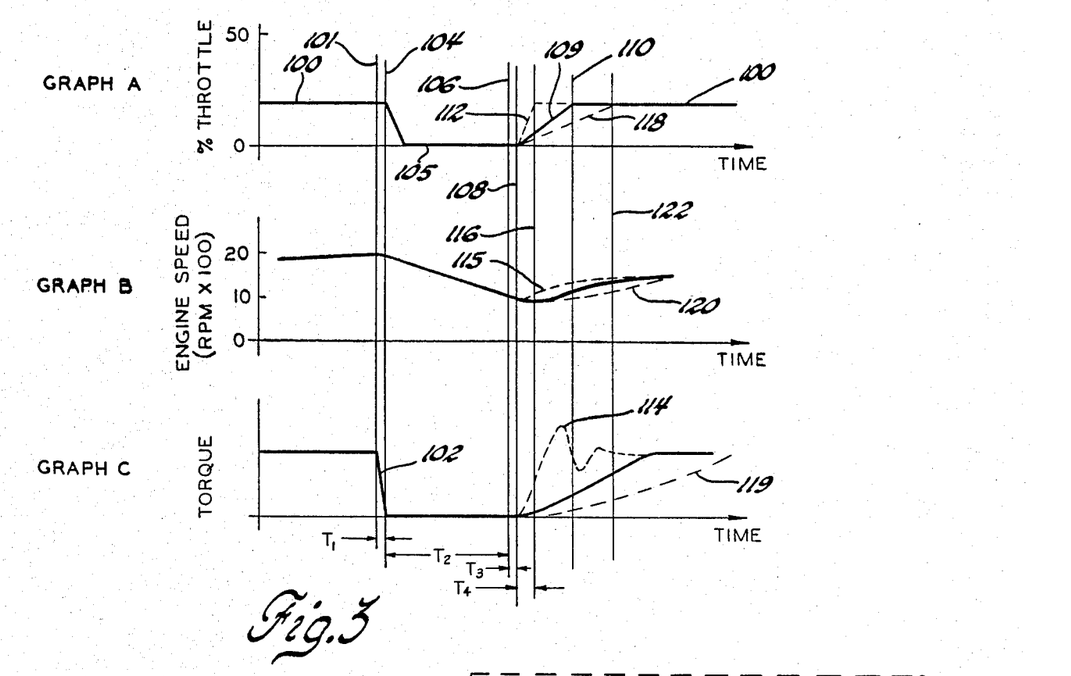
FIG. 3 is a graphical representation of throttle setting, engine speed, and output torque verses time, illustrating the effect of the throttle return rate.

The graphs of FIG. 3 illustrate the relationship between throttle return and transmission output torque for a typical constant throttle upshift. The output torque of the transmission is considered to be an important parameter as it closely corresponds to the shift feel experienced by the passengers in the vehicle. Graph A depicts the setting of engine throttle 14 verses time, graph B depicts engine speed verses time, and graph C depicts transmission output torque verses time, all graphs sharing a common time base. The solid traces correspond to a shift performed in accordance with this invention and the broken traces correspond to shift performed with improper throttle return rates following engagement of a desired gear ratio. As indicated above, the shift forming the basis for these graphs is performed with a constant accelerator pedal setting. Prior to the execution of a shift, engine throttle 14 is controlled in accordance with the accelerator pedal setting as designated by reference numeral 100. Reference numeral 101 designates the initiation of the first step of a shift sequence—temporarily interrupting engine ignition and shifting to neutral. During this step a torque reversal 102 is initiated to ease the tension between transmission gear elements, enabling a solenoid-controlled shift to neutral. Reference numeral 104 designates a time corresponding to the detection of a shift to neutral and the commencement of the next step in a shift sequence—adjusting engine throttle 14 in a manner to synchronize transmission gear elements associated with a desired gear ratio. During this step, the engine throttle setting and engine speed decrease as required for synchronization. For most upshifts, engine throttle 14 becomes fully closed to attain synchronization as indicated by reference numeral 105. It will be appreciated that the throttle setting and engine speed would be increased to synchronize the appropriate gear elements in the case of a downshift. Reference numeral 106 designates a time corresponding to the detection of synchronization and the commencement of the next step in the shift sequence, engaging the desired gear ratio. Reference numeral 108 designates a time corresponding to the engagement of the desired gear ratio and the commencement of the last step of a shift sequence, returning engine throttle 14 into correspondence with the setting of accelerator pedal 36. During this step, engine throttle 14 is returned to the setting designated by reference numeral 100, a setting that corresponds to the constant accelerator pedal setting. The throttle return rate or slope designated by the solid trace 109 is chosen as a function of the difference between the actual throttle setting (zero) and the accelerator pedal setting (designated by reference numeral 100). During this step, engine speed and output torque increase gradually and at a rate corresponding to the accelerator pedal setting. Reference numeral 110 designates the time at which the engine throttle setting and the accelerator pedal setting substantially correspond. At this point, the setting of engine throttle 14 is once again controlled in a closed-loop manner in accordance with the setting of accelerator pedal 36.

Reference numeral 112 designates an improperly high throttle return rate upon engagement of the desired gear ratio. It is to be noted that the improperly high throttle return rate results in abrupt output torque fluctuations as designated by reference numeral 114. Such torque fluctuations result in an abrupt and undesirable shift feel. The abruptness may also be seen in graph B, as designated by reference numeral 115. Reference numeral 116 designates the time at which the engine throttle setting and the accelerator pedal setting substantially correspond for this shift.

Reference numeral 118 designates an improperly slow throttle return rate upon engagement of the desired gear ratio. It should be noted that this throttle return rate results in an undesirably sluggish and unresponsive shift-feel as indicated by slowly rising torque curve 119, and engine speed curve 120. Reference numeral 122 designates the time at which the engine throttle setting and the accelerator pedal setting substantially correspond, ending the shift sequence.

This invention recognizes that the optimum throttle return rate following gear engagement varies as a function of the difference between the engine throttle setting and the accelerator pedal setting, as opposed to a constant rate. Accordingly, the greater the difference between the engine throttle setting and the accelerator pedal setting, the faster the throttle return rate chosen by the control system of this invention. According to the preferred embodiment of this invention, throttle return rates for various shifting operations are determined empirically and stored in a read-only semiconductor memory (ROM) as a function of engine throttle and accelerator pedal setting differentials. Each time the throttle return step of a shift sequence is executed, the appropriate throttle return rate is retrieved from the memory location corresponding to the magnitude of the above-referenced setting differential. This technique for storing and retrieving previously determined data as a function of variable operating parameters, is well known to those skilled in the art and is exemplified in the patent to Hetzler, U.S. Pat. No. 4,009,699. Alternately, a throttle return rate may be determined by dividing the difference between the throttle and accelerator pedal settings by a constant throttle return time. A throttle return rate chosen in accordance with the alternate method described above will result in an acceptable shift feel, but a throttle return rate chosen in accordance with the preferred embodiment of this invention will be better suited to the particular drive train of the vehicle.

Figure 4:
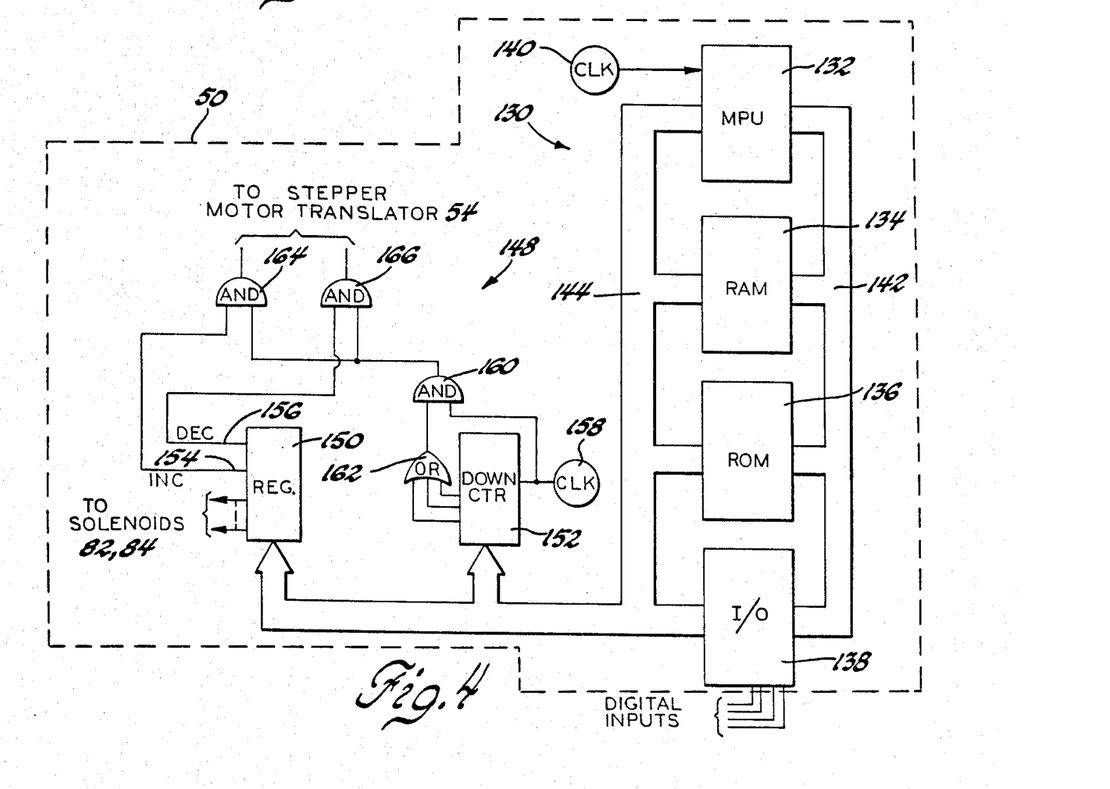
FIG. 4 is a block diagram of a general purpose microprocessor-based control system and interface circuit for implementing this invention.

Referring now to FIG. 4, reference numeral 130 generally designates a block diagram of a microprocessor system that may be used to implement this invention. Detailed information relating to specific clocking and gating arrangements have not been shown since such techniques are well known to those skilled in the art. Reference numeral 132 designates a microprocessor unit (MPU) for directing the execution of a set of programmed instructions. Reference numeral 134 designates a read-write or random-access memory (RAM) to be used for the storage of temporary or updated data, such as the engine throttle and accelerator pedal settings. Reference numeral 136 designates a read-only memory (ROM) to be used for the storage of program instructions and permanent data tables, such as the data table for throttle return rates. Reference numeral 138 designates an interface circuit (I/0) for controlling the acquisition of input data such as gear selection and shaft speed information and the transfer of output data such as control pulses for stepper motor translator 54. The MPU 132 receives clock pulses from clock 140 and generates the timing signals for the remainder of the system. The MPU 136 communicates with the rest of the system via address bus 142 and bi-directional data bus 144. The MPU 132 may be any of a number of well known devices, one of such being the Motorola MC 6800 microprocessor. The other elements (RAM 134, ROM 136, and I/0 138) may be any of a number of commercially available devices compatable with MPU 132. If MPU 132 is a Motorola MC 6800, RAM 134 may be the MCM 6810, ROM 136 may be the MCM 6830 and I/0 device 138 may be the MC 6820 Peripheral Interface Adapter, each of which is manufactured by Motorola Semiconductor Products, Inc., Phoenix, Ariz., and described in the MC 6800 Microprocessor Application Manual available from that corporation. From the foregoing, it should be apparent that this invention is not limited to an MC 6800 microprocessor and that any of a number of commercially available units are equally capable of performing the functions comprising the subject matter of this invention. Also, it should be apparent that this invention may be implemented as well with analog or digital hardware circuitry.

Reference numeral 148 generally designates the circuitry used to interface the microprocessor system with solenoids 82 and 84 and stepper motor translator 54. As indicated in reference to FIG. 1, MPU controller 50 determines the various throttle adjustments, develops a signal in accordance with the adjustments, and applies that signal to stepper motor translator 54 in a standard format. Most generally, the standard format comprises a series of pulses applied to one or the other of two input lines 47, 48 to the translator. One line corresponds to clockwise rotation and the other line corresponds to counterclockwise rotation. For each pulse the stepper motor translator receives, the appropriate stepper motor windings are energized to rotate the output shaft of the stepper motor a predetermined amount. As applied to the control system of this invention, each pulse applied to stepper motor 52 rotates engine throttle 14 one percent (1%); one hundred percent (100%) rotation corresponding to 90 degrees of rotation. That is, each pulse applied to translator 54 rotates the output shaft of stepper motor 52 1/90th of a mechanical degree. The specific stepper motor and stepper motor translator referred to by way of example in reference to FIG. 1 satisfy the above stated specifications. The output of microprocessor 130 comprises two signals for controlling throttle adjustment: one to indicate the direction of throttle adjustment, the other to indicate the magnitude of throttle adjustment. Output signals indicative of throttle adjustment direction as well as shift solenoid energization are applied via data bus 144 to output register 150. To increase the throttle opening, for example, microprocessor 130 would set a logical 1 at the output terminal designated by reference numeral 154 (INC). Similarly, a logical 1 is set at output terminal 156 (DEC) to decrease the opening of engine throttle 14. Obviously, the shift solenoids 82 and 84 may be energized in a similar manner whereby one output terminal of register 150 is associated with each solenoid, and the logical level present at the terminal indicates the desired energization. As indicated above, digital numbers representing throttle return rates may be stored in read-only memory 136 as a function of engine throttle and accelerator pedal setting differentials for various shift sequence conditions. The digital number indicative of the appropriate throttle return rate is loaded into the output register of down-counter 152 over data bus 144. In response to the loading of the throttle return rate number, clock 158 applies a series of electrical pulses to the clock input terminal of down-counter 152 so that the number appearing at the output of the device is decremented to zero at a rate determined by the frequency of clock 158. The output of clock 158 is also applied to one input of AND gate 160. Each output terminal of down-counter 152 is applied as an input to OR gate 162, which serves to detect an all-zero condition. That is, the output of OR gate 162 is only energized when a non-zero digital number appears at the output terminal of down-counter 152. The output of OR gate 162 is connected as the other input to AND gate 160 so that clock pulses from clock 158 are passed to the output of AND gate 160 only when the output of down-counter 152 is not zero. Thus, if a digital three is loaded into down-counter 152, three clock pulses from clock 158 will be passed to the output of AND gate 160 before the output of down-counter 152 is equal to zero. If a digital five is loaded into down-counter 152, five pulses will sequentially appear at the output of AND gate 160, and so on. The output of AND gate 160 is applied as an input to both AND gates 164 and 166, the outputs of which are connected as inputs to stepper motor translator 54. Output line 154 of register 150 is applied to the other input of AND gate 164 and output line 156 of register 150 is applied as the other input to AND gate 166. In this way, the clock pulses appearing at the output of AND gate 160 will appear at the output of either AND gate 164 or AND gate 166, depending upon which output terminal (154 or 156) of register 150 is energized. It should be obvious that at no time may both output terminals 154 and 156 be energized. From the foregoing it should be apparent that in order to increase the setting of engine throttle 14 five percent (5%), microprocessor 130 must load a digital five into down-counter 152, in addition to energizing output line 154 of register 150. As a result, the output of AND gate 166 would not be energized, while five voltage pulses would appear at the output of AND gate 164. Accordingly, stepper motor translator 54 would energize the appropriate windings of stepper motor 52 in a manner to increase the setting of engine throttle 14 by five percent (5%).

Figure 5:
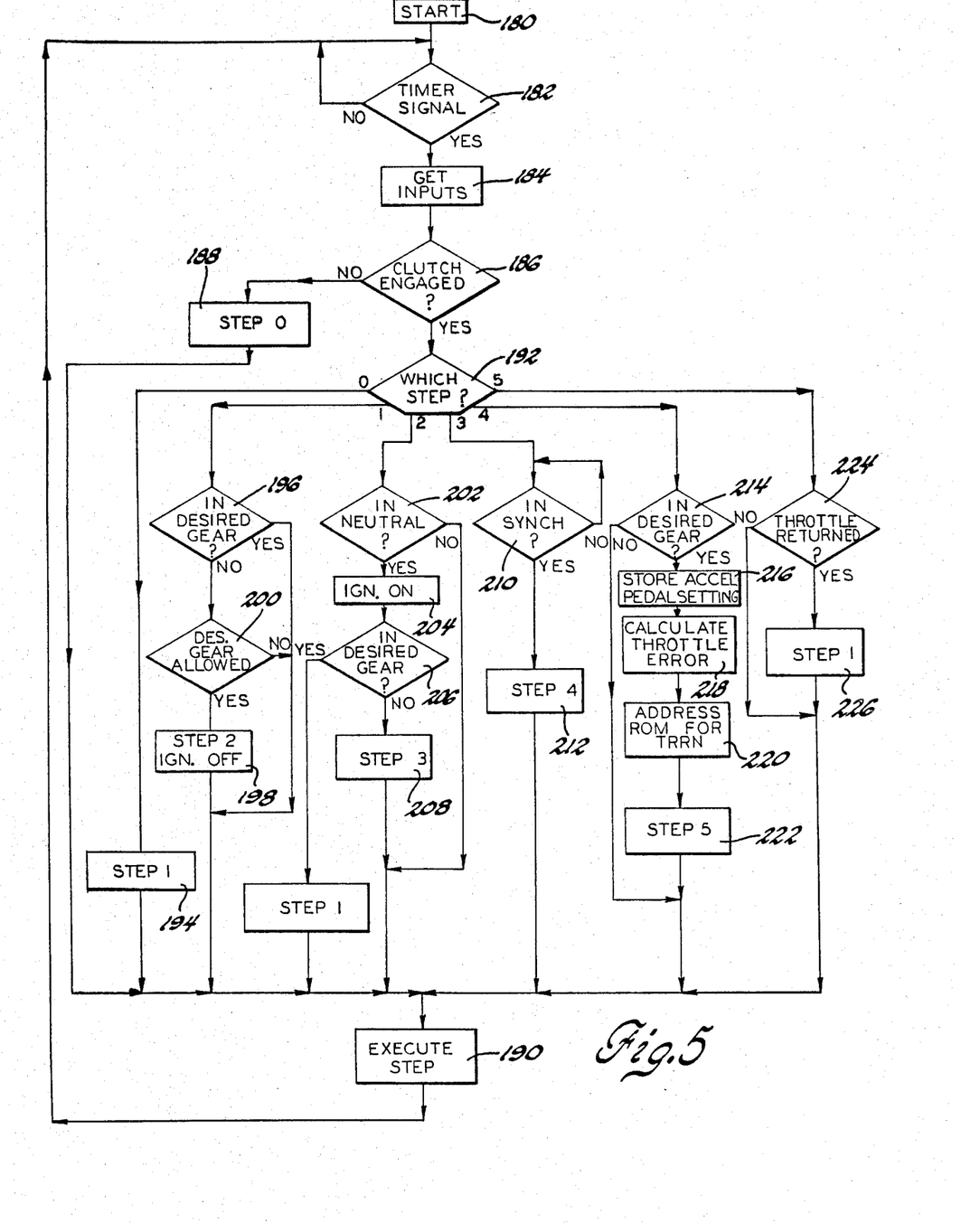
FIG. 5 and FIG. 6 are flow diagrams for implementing this invention with a programmed microprocessor.

FIG. 5 is an executive flow diagram for implementing this invention with a microprocessor such as the one shown in FIG. 4. The executive flow diagram represents the portion of a computer program that organizes and directs the execution of the various shift sequence steps. When it is determined that a particular step should be performed, the executive directs the execution of the instruction set for that step, which is stored as a subroutine in ROM 136. The initial start-up instructions designated by reference numeral 180 are encountered each time the electrical system of the vehicle is energized. During this time the various registers and counters are initialized to zero. Also, (for reasons to be discussed) stepper motor 52 is adjusted to a closed throttle position, as may be detected by a throttle mounted micro-switch or other such device (not shown). The executive flow diagram then awaits a timing signal before proceeding. A low frequency timer signal (such as 100 Hz) may be obtained by dividing down the clock frequency provided by clock 140. The function of the timer signal is to establish a substantially fixed loop time for executing the programmed instructions. The importance of establishing a fixed loop cycle time will become apparent as the description of FIGS. 5 and 6 proceeds. As will be well known to those skilled in the art, the time during which the microprocessor is awaiting the timer signal may be used to perform other vehicular tasks such as controlling engine spark timing. The executive flow diagram monitors the occurence of the timer signal (block 182) and proceeds to collect inputs (block 184) when the timer signal is received. At this point, various inputs such as shaft speeds, accelerator pedal setting, gear selector setting, as well as limit switch conditions, are read into the microprocessor through I/0 device 138. As designated by reference numeral 186, the executive flow diagram then determines if clutch 16 is engaged. If clutch 16 is not engaged, no shift sequence is required and transmission 20 may be shifted at once in accordance with the output of gear selector 30. The subroutine instruction set for performing the above function is designated as step 0, and a digital 0 is stored (block 188) in a particular memory location in RAM 134 to designate which subroutine is to be executed. The executive flow diagram then directs the execution (block 190) of the step corresponding to the digital number stored in the above-mentioned memory location, hereinafter referred to as the step register. After executing the indicated subroutine, the microprocessor executive returns to block 182 to wait for the next timer signal. When clutch 16 is engaged, decision block 192 reads the contents of the step register and directs an evaluation of the various inputs corresponding to the step to be performed to determine if a new step is required. If a digital 0 is stored in the step register, block 194 changes the contents of the step register to a digital 1 (indicative of step 1) since clutch 16 is engaged. Step 1 represents a subroutine for controlling the setting of engine throttle 14 in accordance with the setting of accelerator pedal 36, but not shifting the transmission gear ratios at will. Once clutch 16 is engaged, a shift sequence must be performed in order to shift gear ratios. If decision block 192 detects a digital 1 in the step register, block 196 of the executive flow diagram determines if the desired gear ratio obtained from gear selector 30 is engaged. As explained before, the engagement of a particular gear ratio may be determined with limit switches and logic circuitry (not shown) that indicate the position of transmission control arms 78 and 80. If the desired gear ratio is engaged, the contents of the step register is not modified and step 1 is re-executed (block 190). If the desired gear ratio is not engaged, the step register is changed to a digital 2 (block 198) once it is determined that the desired gear ratio is allowable (block 200). The allowability of a desired gear ratio depends upon various transmission operating conditions. For example, if output shaft 22 is rotating in a direction to propel the vehicle in a forward direction, reverse gear ratio (R) is not an allowable gear ratio. As should be appreciated, this safeguard prevents the control system of this invention from trying to execute an impossible or mechanically undesirable shift. Step 2 represents a subroutine for performing the first actual step of a shift sequence—shifting transmission 20 to a neutral position. As noted earlier, this step is facilitated by temporarily actuating switch 28 to short the engine ignition (block 198) to cause an engine torque reversal. After the step 2 program instructions are executed (block 190), fresh input values are obtained (block 184) and decision block 192 reads the contents of the step register. If a digital 2 is stored in the step register, block 202 of the executive flow diagram determines if transmission 20 has been shifted to neutral in accordance with the execution of step 2. If not, step 2 is re-executed (block 190) until transmission 20 is shifted to the neutral position. As soon as neutral position is detected, the engine ignition is re-energized (block 204) and a check is made to determine if the desired gear ratio is engaged (block 206). If gear selector 30 is in the neutral (N) position, the desired gear ratio is engaged and the contents of the step register is reset to a digital 1, indicating a non-shift (step 1) mode of operation. If gear selector 30 is not in the neutral position (N), the desired gear ratio is not engaged, and a digital 3 is placed in the contents of the step register, as designated by reference numeral 208. Step 3 is indicative of a subroutine for making throttle adjustments to synchronize transmission gear elements associated with the desired gear ratio. After step 3 has been executed (block 190) and fresh input values have been obtained (block 184), block 210 of the executive program determines if synchronism has substantially occurred. As noted above, this determination may be simply made by dividing the output of speed transducer 24 by the output of speed transducer 26 and comparing the result with the known gear ratio for the desired gear. Once the appropriate gear elements are synchronized, a digital 4 is placed in the contents of the step register (block 212) and the step 4 program instructions are executed (block 190). Step 4 represents a subroutine for performing the next step of the shift sequence—engaging the desired gear ratio. After fresh input valves are obtained, block 214 of the executive program determines if the desired gear ratio has been engaged in accordance with the execution of step 4. If not, the step 4 instructions are re-executed (block 190). If the desired gear is engaged, the accelerator pedal setting is stored (block 216) and subtracted from the actual throttle setting (block 218) to determine the initial throttle error. It should be noted at this point that the actual throttle setting may be obtained without the use of a separate sensor by incrementing or decrementing a register for each pulse applied to stepper motor 52, the register being incremented when the throttle opening is increased and decremented when the throttle opening is decreased. Since throttle 14 is initially calibrated to the closed throttle position, and each adjustment pulse moves throttle 14 one percent (1%), the number stored in the register would be equal to the instant throttle position. The calculated throttle error is then used (block 220) to address a look-up table in read-only memory 136 to determine a throttle rate return number (TRRN) as a function of the error. A digital 5 is then stored in the contents of the step register (block 222) to indicate the commencement of the last step (step 5) of the shift sequence, throttle return. The step 5 program instructions are then executed as indicated at block 190. After fresh input values are obtained (block 184), block 224 of the executive program determines if engine throttle 14 has been returned to correspond with the setting of accelerator pedal 36. If not, step 5 is re-executed as indicated at block 190 until substantial correspondence is detected. Once the actual and desired throttle setting substantially correspond, the contents of the step register is reset to a digital 1 (block 226), indicating the end of the shift sequence.

Figure 6:
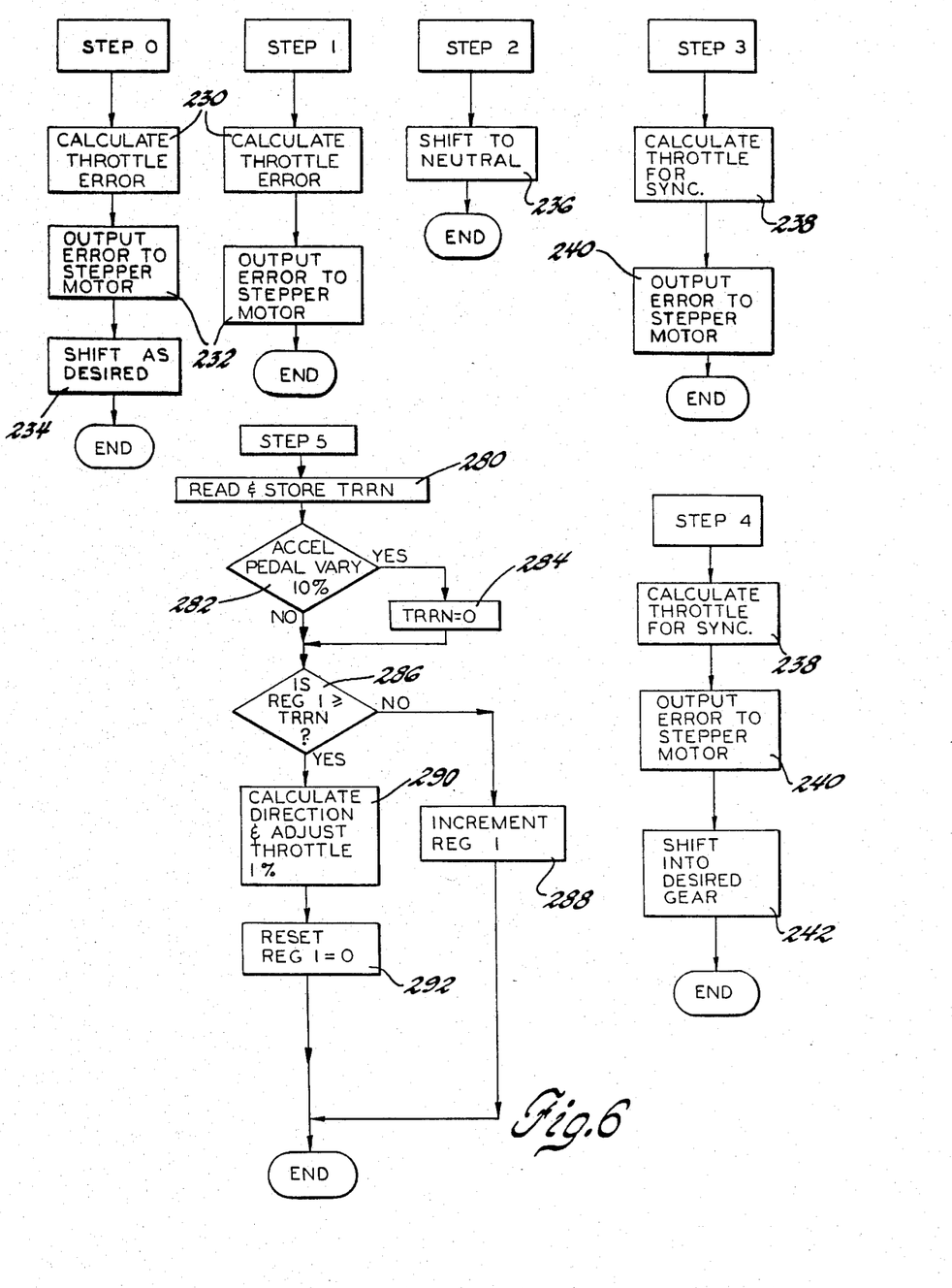

The various instruction sets for performing steps 0–5 are illustrated by way of flow diagrams in FIG. 6. Steps 0 and step 1 both establish a follow-up control system wherein engine throttle 14 is controlled in accordance with the setting of accelerator pedal 36. Acoordingly, the setting of engine throttle 14 is subtracted from the setting of accelerator pedal 36 to determine the magnitude and direction of the error as indicated by reference numeral 230. Stepper motor 52 is then energized as indicated by reference numeral 232 to adjust engine throttle 14 in a manner to reduce the error to zero. Since follow-up controls of the above type are well known, further description is not considered to be necessary. Step 0 (clutch disengaged) additionally permits energization of solenoids 82 and 84 to shift gear ratios in accordance with gear selector 30 as indicated by reference numeral 234. In step 2, solenoids 82 and 84 are controlled to shift the transmission to a neutral position as indicated by reference numeral 236. In steps 3 and 4, stepper motor 52 is controlled to adjust engine throttle 14 in a manner to bring transmission gear elements associated with the desired gear ratio into synchronism. Iterative throttle adjustments for achieving synchronism may be calculated as a function of various input parameters once the engine transfer function (the time-variant relationship between a throttle adjustment and the resultant engine speed) is determined. As will be well known to those skilled in the art, the transfer function for a particular engine or class of engines may be determined mathematically, using empirical techniques to identify the various constants associated with the performance characteristics of the engine. According to the preferred embodiment of this invention, the transfer function is in the form of a delayed exponential, the delay representing the engine response lag. Thus, each time step 3 or step 4 is executed, a throttle adjustment may be calculated as indicated by reference numeral 238 as a partial function of the difference between the engine speed required for synchronism and the actual engine speed as determined from speed transducer 24. Other factors effecting the calculation may include previously calculated engine speed errors and throttle adjustments.

It should be appreciated that the calculation referred to above forms no part of this invention and is but one way to determine appropriate throttle adjustments for synchronizing the various transmission gear elements. Alternatively, a follow-up controller could be used or digital numbers indicative of various throttle adjustments could be stored in a semiconductor look-up table such as ROM 136 as a function of various input parameters including engine speed error.

The desired throttle position from each calculation is used to develop a throttle adjustment which is applied to stepper motor 52 (block 240) in the manner described in reference to FIG. 4. Although step 4 is associated with the engagement of the desired gear ratio, engine throttle 14 is also adjusted for synchronism (block 238) during this step to ensure smooth gear engagement (block 242).

Step 5 relates to the throttle return step of the shift sequence. A throttle return rate number (TRRN) is read from the addressed memory location in ROM 136 and stored in an alterable memory location of RAM 134 (block 280). The program instructions corresponding to flow diagram blocks 282 and 284 are used to implement the second embodiment of this invention which varies the throttle return rate if accelerator pedal 36 is abruptly moved during the execution of step 5. For the purpose of clarity, however, the first embodiment of this invention (incorporating a single throttle return rate) will be described first. As indicated at block 286, the throttle rate return number (TRRN) is compared with the contents of a further memory location (REG 1) of RAM 134. REG 1 is among the various memory locations and registers initialized to zero as noted in reference to START block 180 in FIG. 5. If REG 1 is less than TRRN, the memory location corresponding to REG 1 is incremented by one (block 288). However, if REG 1 equals or exceeds TRRN, engine throttle 14 is adjusted one percent (1%) in a direction toward the setting of accelerator pedal 36 (block 290), and REG 1 is reset to zero (block 292). From the foregoing, it should be apparent that the magnitude of TRRN controls the rate at which engine throttle 14 is brought into correspondence with the setting of accelerator pedal 36. For example, if for a given difference between the accelerator pedal setting and the engine throttle setting, TRRN equals 5, the program instructions of step 5 must be executed 5 times before a throttle adjustment of one percent (1%) can be made. Since the timer signal discussed in reference to FIG. 5 establishes a relatively fixed loop cycle time, the value of TRRN may be directly converted into throttle return rate. By way of further example, a one percent (1%) throttle adjustment would be made for each loop cycle if TRRN were equal to zero. When block 224 of the executive program determines that the engine throttle and accelerator pedal settings correspond, the final step of the shift sequence (step 5) is complete.

As mentioned above, the throttle return rate may be modified according to a second embodiment of this invention if the setting of accelerator pedal 36 is abruptly changed during the throttle return step (step 5) of the shift sequence. This embodiment may be implemented by adding to step 5 program instructions corresponding to flow diagram blocks 282 and 284. Each time through the loop the accelerator pedal setting stored just prior to the commencement of step 5 (block 216) is compared to the instant setting of accelerator pedal 36. If their difference (in percent throttle) is less than a set amount (10%, for example), the execution of step 5 proceeds in the manner described above. If, however, their difference equals or exceeds the set amount, TRRN is reset to zero (block 284) so that engine throttle 14 is brought into correspondence with accelerator pedal 36 at a rate of one percent (1%) per loop cycle. That is, a ten percent (10%) or greater adjustment of accelerator pedal 36 during the throttle return step results in the fastest throttle return rate available. As indicated before, it is contemplated that despite an abrupt shift feel, the high return rate most closely corresponds to the expectations of the driver when the accelerator pedal setting is abruptly adjusted.

The operation of this invention as applied to a motor vehicle will now be described. When the vehicle ignition switch is initially closed, power is applied to MPU controller 50 and various registers and memory locations such as the output registers and counters, TRRN, and REG 1 are reset to zero, and stepper motor 52 is adjusted to the closed throttle position. A timer signal is received and various inputs including shaft speeds, accelerator pedal setting, and limit switch data, are read into RAM 134 through I/0 device 138. Assuming clutch 16 is disengaged, a zero is stored in the step register and solenoids 82 and 84 are operative to shift the transmission in accordance with the position of gear selector 30. The timer signals are generated at a sufficiently high frequency so that the operator will not perceive a delay in response. Once clutch 16 is engaged (either manually or automatically depending upon the type of clutch used) a digital 1 is stored in the step register and the transmission may no longer be instantly shifted in accordance with gear selector 30. When the driver requests a gear ratio other than the one engaged, a digital 2 is stored in the step register and the engine ignition is interrupted so that the transmission may be shifted to neutral. Once the transmission is shifted to neutral, the ignition function is resumed and if the desired gear ratio is not yet engaged, a digital 3 is stored in the step register, initiating the synchronization step of the shift sequence. If the desired gear ratio is engaged, gear selector 30 is in the neutral position and a digital 1 is stored in the step register indicating that the engine throttle is to be controlled in accordance with the accelerator pedal position. When the gear elements associated with the desired gear ratio are in synchronism, a digital 4 is stored in the step register and the appropriate solenoids 82 or 84 are energized to engage the desired gear ratio as determined from gear selector 30. Once the desired gear ratio is engaged, the accelerator pedal setting is stored in a memory location in RAM 134. The difference between the accelerator pedal setting and the engine throttle setting is then used to address a look-up table in ROM 136, and a throttle return rate number (TRRN) corresponding to the difference is read from ROM 136 and stored for future reference. Register REG 1 (which was reset to zero in the initialization step) is compared with the throttle rate return number (TRRN)—if REG 1 is less than TRRN, REG 1 is incremented. If the engine throttle setting has not yet been returned to the accelerator pedal setting, REG 1 is again compared with TRRN and incremented if less than TRRN, and so on. Once REG 1 equals or exceeds TRRN, engine throttle 14 is adjusted one percent (1%) in a direction to correspond with the accelerator pedal setting. REG 1 is then reset to zero and the above process is continued until the engine throttle setting corresponds with the accelerator pedal setting, at which point the step register is reset to a digital 1, indicating a non-shift mode of operation.

As indicated in reference to FIG. 6, the accelerator pedal position may be monitored during the execution of step 5 to detect an abrupt movement of accelerator pedal 36. If such a movement is detected, TRRN is reset to zero so that engine throttle 14 will be adjusted one percent (1%) each loop cycle until the engine throttle setting corresponds with the accelerator pedal setting.

Although this invention has been described in reference to specific embodiments, it is to be recognized that this invention is not meant to be limited thereto, and that various modifications may be made without departing from the actual scope and spirit of this invention.

The embodiments of the invention in which an exclusive property or privilege is claimed are defined as follows:

1. A method for bringing the setting of a power control means for a power source into correspondence with a manually actuated power control setting upon completion of a shifting mode of operation of a transmission that is driven by the power source wherein the power control means is regulated in accordance with (1) a manually actuated power control setting during non-shift modes of operation and (2) transmission shift requirements during shifting modes of operation, said method comprising the steps of:
   generating a control signal as a function of the difference between the setting of said power control means and said manually actuated power control setting upon engagement of a desired gear ratio;
   adjusting said power control means in a direction to bring its setting into correspondence with said manually actuated power control setting and at a rate corresponding to the value of said control signal; and
   resuming regulation of said power control means in accordance with said manually actuated power control setting when the setting of said power control means substantially corresponds to said manually actuated power control setting.

2. A method for bringing the setting of an engine power control means into correspondence with a manually actuated power control setting upon completion of a shifting mode of operation of a countershaft transmission that is driven by the engine wherein the engine power control means is regulated in accordance with (1) a manually actuated power control setting during non-shift modes of operation and (2) transmission shift requirements during shifting modes of operation, said method comprising the steps of:
   generating a control signal as a function of the difference between the setting of said engine power control means and said manually actuated power control setting upon engagement of a desired gear ratio;
   adjusting said engine power control means in a direction to bring its setting into correspondence with said manually actuated power control setting and a rate corresponding to the magnitude of said control signal;
   increasing said rate in response to a sensed change in said manually actuated power control setting; and resuming regulation of said engine power control means in accordance with said manually actuated power control setting when the setting of said engine power control means substantially corresponds to said manually actuated power control setting.

3. A method for bringing a power control means setting of a vehicle power source into correspondence with a manually actuated accelerator setting upon completion of a shifting mode of operation of a transmission that is driven by the power source wherein the power control means is regulated in accordance with (1) the accelerator setting during non-shift modes of operation and (2) transmission shift requirements during shifting modes of operation, said method comprising the steps of:

generating a control signal as a function of the difference between the setting of said power control means and said accelerator setting upon engagement of a desired gear ratio;

adjusting said power control means in a direction to bring its setting into correspondence with said accelerator setting and at a rate corresponding to the magnitude of said control signal;

modifying said rate in response to a sensed change in said accelerator setting; and resuming regulation of said power control means in accordance with said accelerator setting when the setting of said power control means substantially corresponds to said accelerator setting.

4. A method for bringing the setting of a power control means for a power source into correspondence with a manually actuated power control setting upon completion of a shifting mode of operation of a transmission that is driven by the power source wherein the power control means is regulated in accordance with (1) a manually actuated power control setting during non-shift modes of operation and (2) transmission shift requirements during shifting modes of operation, said method comprising the steps of:

addressing a memory device with a signal corresponding to the difference between the power control means setting and said manually actuated power control setting upon engagement of a desired gear ratio;

retrieving a previously stored control signal from said memory device, said control signal being indicative of a return rate for said power control means;

adjusting said power control means in a direction to bring its setting into correspondence with said manually actuated power control setting and at a rate corresponding to the value of said control signal; and resuming regulation of said power control means in accordance with said manually actuated power control setting when the power control means setting substantially corresponds to said manually actuated power control setting.

5. A method for bringing the setting of an engine power control means into correspondence with a manually actuated power control setting upon completion of a shifting mode of operation of a countershaft transmission that is driven by the engine wherein the engine power control means is regulated in accordance with (1) a manually actuated power control setting during non-shift modes of operation and (2) transmission shift requirements during shifting modes of operation, said method comprising the steps of:

addressing a memory device with a signal corresponding to the difference between the setting of said engine power control means and said manually actuated power control setting upon engagement of a desired gear ratio;

retrieving a previously stored control signal from said memory device, said control signal being indicative of a return rate for said engine power control means;

adjusting said engine power control means in a direction to bring its setting into correspondence with said manually actuated power control setting and a rate corresponding to the magnitude of said control signal;

modifying said rate in response to a sensed change in said manually actuated power control setting; and resuming regulation of said engine power control means in accordance with said manually actuated power control setting when the setting of said engine power control means substantially corresponds to said manually actuated power control setting.

6. A method for automatically shifting a vehicular multi-gear ratio countershaft transmission that is driven by a power plant having an adjustable power control means, the steps comprising:

adjusting said power control means in accordance with a manually actuated power control setting;

generating a shift signal indicative of a new gear ratio for said transmission when it is desired to shift said transmission from an existing gear ratio to said new gear ratio;

shifting said transmission to neutral in response to said shift signal;

adjusting said power control means in manner to cause engageable transmission elements associated with said new gear ratio to rotate in substantial synchronism;

engaging said transmission elements associated with said new gear ratio when substantial speed synchronism occurs;

in response to said engagement, adjusting said power control means in a direction to bring its setting into correspondence with said manually actuated power control setting and at a rate corresponding to their difference upon engagement of said new gear ratio;

resuming control of said power control means in accordance with said manually actuated power control setting when the setting of said power control means substantially corresponds to said manually actuated power control setting.

7. A method for automatically shifting a vehicular multi-gear ratio transmission that is driven by a power source having an adjustable power control means, the steps comprising:

adjusting said power control means in accordance with a manually actuated power control setting;

generating a shift signal indicative of a new gear ratio for said transmission when it is desired to shift said transmission from an existing gear ratio to said new gear ratio;

shifting said transmission to neutral in response to said shift signal;

adjusting said power control means in a manner to cause engageable transmission elements associated with said new gear ratio to rotate in substantial speed synchronism;

engaging said transmission elements associated with said new gear ratio when substantial synchronism occurs;

in response to said engagement, adjusting said power control means in a direction to bring its setting into correspondence with said manually actuated power control setting at a rate corresponding to their difference upon engagement of said new gear ratio;

modifying said rate in response to a sensed change in said manually actuated power control setting; and resuming control of said power control means in accordance with said manually actuated power control setting when the setting of said power control means substantially corresponds to said manually actuated power control setting.

8. A throttle control system for the power source of a vehicle having an accelerator and an automatic shift countershaft transmission having an input shaft driven by the power source, comprising:

electrically energizable actuator means for controlling the setting of the power source throttle in accordance with a control signal applied thereto;

first means effective to develop a first control signal for said actuator means as a function of the setting of said accelerator, said first control signal being effective when applied to said actuator means to establish a follow-up control system between said throttle and said accelerator;

second means effective to develop a second control signal for said actuator means as a function of the speed difference between the input shaft of said transmission and a gear element to be engaged, said second signal being effective when applied to said actuator means to establish a follow-up control system between said input shaft and said gear element to effect speed identity therebetween;

third means effective to develop a third control signal for said actuator means, said third control signal being effective when applied to said actuator means to progressively return the setting of said throttle into correspondence with the setting of said accelerator; and programmed control means effective to, in sequence, (1) apply said first control signal to said actuator means to define a non-shifting mode of operation, (2) apply said second control signal to said actuator means in response to a shift command to define a speed synchronization step of a shift mode of operation, (3) apply said third control signal to said actuator means following engagement of said gear element to define a throttle return step of said shift mode of operation, and (4) reapply said first control signal to said actuator means in response to substantial correspondence between the settings of said accelerator and said throttle to complete said shift mode of operation and to resume said non-shift mode of operation.

9. A throttle control system for the power source of a vehicle having an accelerator and an automatic shift having an input shaft driven by the power source, comprising:

electrically energizable actuator means for controlling the setting of the throttle in accordance with a control signal applied thereto;

first means effective to develop a first control signal for said actuator means as a function of the setting of said accelerator, said first control signal being effective when applied to said actuator means to establish a follow-up system between said throttle and said accelerator;

second means effective to develop a second control signal for said actuator means as a function of the speed difference between the input shaft of said transmission and a gear element to be engaged, said second signal being effective when applied to said actuator means to establish a follow-up control system between said input shaft and said gear element to effect speed identity therebetween;

third means effective to develop a third control signal, said third control signal being effective when applied to said actuator means to progressively return said throttle to a setting corresponding to the setting of said accelerator following engagement of a desired gear element and at a rate determined in accordance with the difference therebetween at the time of said engagement; and programmed control means effective to, in sequence, (1) apply said first control signal to said actuator means to define a non-shifting mode of operation, (2) apply said second control signal to said actuator means in response to a shift command to define a speed synchronization step of a shift mode of operation, (3) apply said third control signal to said actuator means following engagement of said gear element to define a throttle return step of said shift mode of operation, and (4) reapply said first control signal to said actuator means in response to substantial correspondence between the settings of said accelerator and said throttle to complete said shift mode of operation and to resume said non-shift mode of operation.

10. A throttle control system for an engine driven vehicle having an accelerator and an automatic shift countershaft transmission comprising:

electrically energizable actuator means for controlling the setting of the engine throttle in accordance with a control signal applied thereto;

first means effective to develop a first control signal for said actuator means as a function of the setting of said accelerator, said first control signal being effective when applied to said actuator means to establish a follow-up control system between said engine throttle and said accelerator;

second means effective to develop a second control signal for said actuator means as a function of the speed difference between said engine and a gear element to be engaged, said second signal being effective when applied to said actuator means to establish a follow-up control system between said engine and said gear element to effect speed identity therebetween;

third means defining a third control signal effective when applied to said actuator means to return said engine throttle following engagement of a desired gear element to a setting corresponding to the setting of said accelerator and at a rate corresponding to the difference therebetween at the time of said engagement, said third means being further effective to modify said rate in response to a change in the setting of said accelerator in excess of a reference value; and programmed control means effective to, in sequence, (1) apply said first control signal to said actuator means to define a non-shifting mode of operation, (2) apply said second control signal to said actuator means in response to a shift command to define a speed synchronization step of a shift mode of operation, (3) apply said third control signal to said actuator means following engagement of said gear element to define a throttle return step of said shift mode of operation, and (4) reapply said first control signal to said actuator means in response to substantial correspondence between the settings of said accelerator and said engine throttle to complete said shift mode of operation and to resume said non-shift mode of operation.

11. A throttle control system for an engine driven vehicle, comprising:
actuator means including a bi-directional stepper motor for adjusting the setting of said throttle in accordance with control signals applied thereto;
a plurality of throttle signal generation means for developing a plurality of control signals indicative of throttle response schedules associated with respective modes of operation of said vehicle;
means for selecting a desired mode of operation for said vehicle;
selector means responsive to said last mentioned means for applying said throttle control signal associated with said desired mode of operation of said vehicle to said actuator means whereby said engine throttle is controlled to operate according to a response schedule associated with a desired mode of operation of said vehicle.

12. A gear shift control system for an engine-driven vehicle having an engine power control device, an accelerator, and a gear box shiftable to establish a plurality of speed drive paths, the improvement comprising:
follow-up control means between the accelerator and the power control device so that for any accelerator setting the power control device assumes a corresponding setting;
gear shift control means including programmed elements effective in response to a gear shift command to, in sequence, (a) disable the follow-up control means, (b) reduce engine torque to a value unloading an engaged gear, (c) shift the gear box to a neutral position, (d) adjust the engine power control setting until speed identity exists between the engine and a desired gear, (e) engage the desired gear, and (f) maintain the follow-up disable during a transition period; and
means effective during said transition period to progressively increase or decrease the setting of said engine power control device to a setting corresponding to the accelerator setting and, when the settings agree, to terminate the transition period and enable the follow-up control means.

* * * * *